Aug. 29, 1961
W. J. CHANCELLOR
2,997,891
TRANSMISSION CONTROL
Filed Oct. 26, 1959
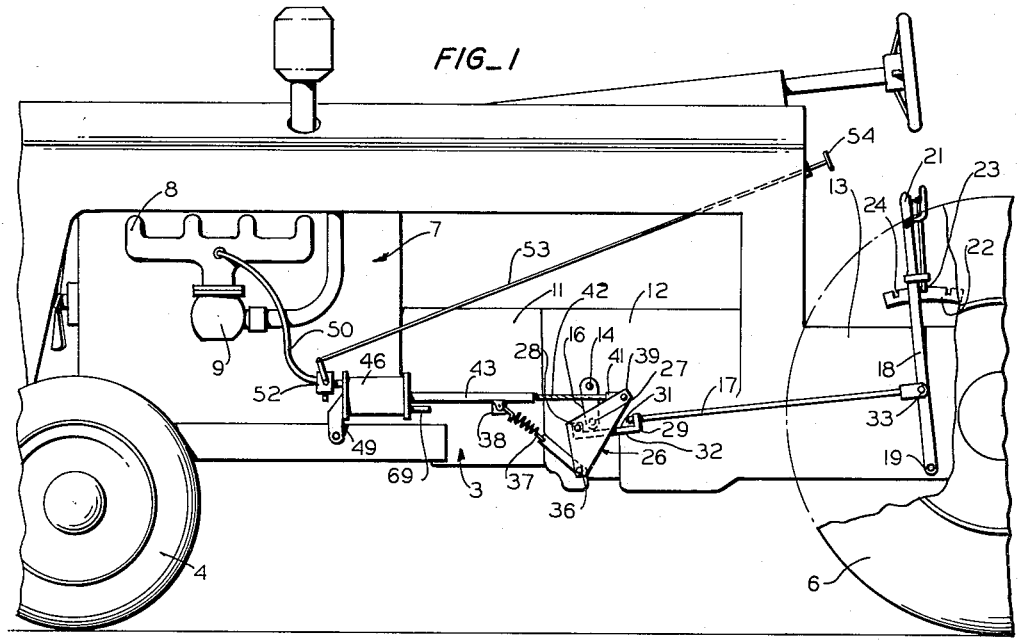
FIG_1
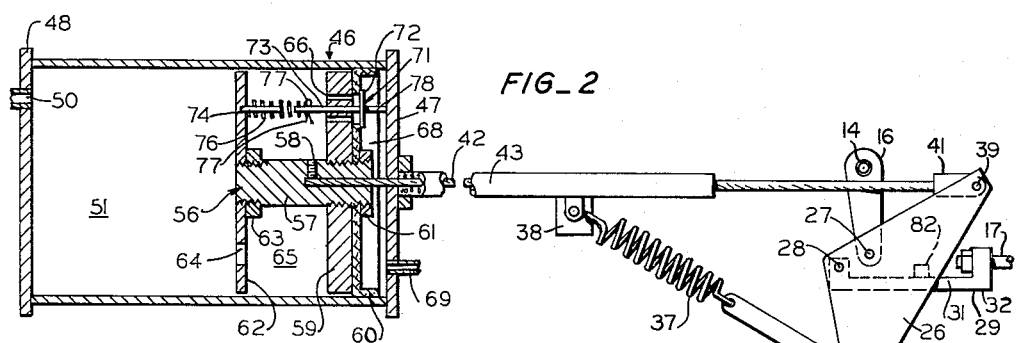
FIG_2
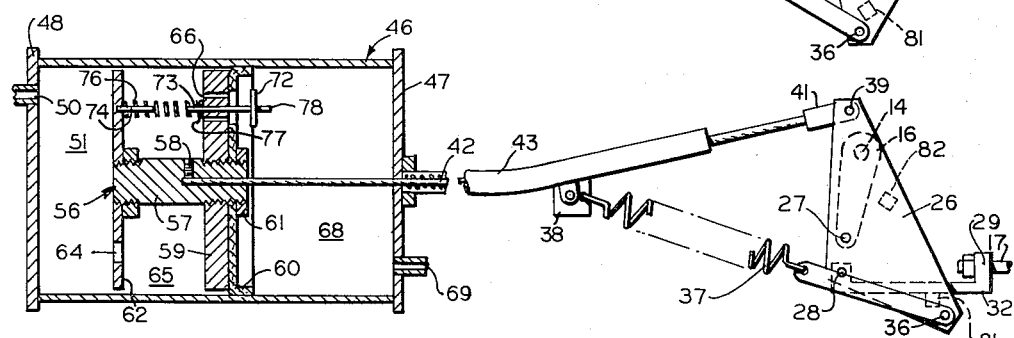
FIG_3
INVENTOR.
WILLIAM J. CHANCELLOR
BY
Lothrop & West
ATTORNEYS

United States Patent Office 2,997,891
Patented Aug. 29, 1961

2,997,891
TRANSMISSION CONTROL
William J. Chancellor, Davis, Calif., assignor to The Regents of the University of California, Berkeley, Calif.
Filed Oct. 26, 1959, Ser. No. 848,765
5 Claims. (Cl. 74—335)

My invention relates to devices for automatically shifting a change-speed transmission between one speed and another in accordance with operating conditions of the vehicle on which the transmission is utilized. While the mechanism is well adaptable to various different environments, it is especially considered herein in connection with a farm tractor. For example, the tractor has an internal combustion engine coupled to and driving a planetary transmission having at least two forward speeds and effective to drive the ground-engaging wheels of the tractor. Sometimes also the power plant drives a power take-off pulley. While the internal combustion engine can be of any suitable type, the description herein is concerned with an engine of the spark-ignition type having an intake manifold in which the vacuum varies from time to time depending upon operating conditions.

In a vehicle of this sort, it is highly desirable to have the engine coupled to the ground-engaging wheels at the most favorable gear ratio under varying operating conditions. The tractor sometimes operates under full load and sometimes under a very light load and often operates at varying loads between the extremes. While the vehicle operator has the option of changing the gear ratio by shifting gears from time to time, he is often engaged in other activities and cannot always pay the closest attention to the vehicle operation. Also, even the best manually supervised operation is found to be somewhat less effective than a good automatic arrangement.

It is therefore an object of my invention to provide a transmission control for the type of installation indicated in which there is a shift between at least two gear ratios, depending upon operating conditions, the shift being effectuated automatically and at an optimum time.

Another object of the invention is to provide an automatic transmission control which can be applied to vehicles already in existence to give them the added advantages of an automatic gear shift whereas initially they were supplied only with a manual gear shift.

Another object of the invention is to provide an automatic control which can be applied with very little work and without any substantial or major alteration in the vehicle to which the attachment is made.

Another object of the invention is to provide a transmission control which is applicable to a vehicle such as a tractor in such a way that there can be overriding manual control whenever desired.

Another object of the invention is to provide a transmission control which will not produce deleterious effects such as freewheeling when the vehicle is operating at negative load, for example, going downhill.

A still further object of the invention is to provide a generally improved transmission control.

Other objects, together with the foregoing, are attained in the embodiment of the invention described in the accompanying description and illustrated in the accompanying drawings, in which:

FIGURE 1 is a side elevation of a vehicle such as a wheeled tractor of standard sort to which the transmission control of the invention has been applied.

FIGURE 2 is a diagrammatic view showing some of the essential portions of the transmission control in a low speed position, with parts broken away to disclose the interior in vertical longitudinal cross-section.

FIGURE 3 is a view comparable to FIGURE 2, but showing the parts in a high speed position.

While the automatic transmission control pursuant to the invention can be utilized in any one of numerous different environments, it has with success been incorporated into a farm tractor as illustrated herein. In this instance, the tractor comprises a power plant 3 mounted on front dirigible wheels 4 and on rear driving wheels 6. The power plant 3 includes an internal combustion engine 7, preferably of the gasoline-burning, spark-ignition type, having an intake manifold 8 connected to a carburetor 9 controlled by a suitable governor, not illustrated, responsive to the engine speed. The engine 7 is connected by intermediate driving mechanism 11 to a change-speed transmission 12. The transmission 12 preferably is of the planetary type having at least two gear ratios, sometimes called speeds, such as a high speed forward and a low speed forward, and is itself coupled to a final drive mechanism generally indicated by the housing 13 carried on the rear driving wheels 6.

As the tractor is initially supplied, the change-speed transmission 12 is equipped with a cross-shaft 14 having a control lever 16 depending therefrom. This is originally connected by means of a clevis (not shown and now omitted) to a control rod 17 joined to a manual lever 18. This lever is pivoted, as at 19, to the power plant structure and is controlled by a handle 21 arranged so that the lever 18 in traversing a partial quadrant 22 can be latched in any one of several positions indicated by notches 23 and 24.

In applying the transmission control of the invention to the standard tractor, the connection between the control lever 16 and the rod 17 (having been interrupted by removal of the original clevis) is partly re-established by mounting a bell-crank 26 or operating lever on the end of the lever 16. The bell-crank is connected to the lower end of the control lever 16 by means of a pivot connection 27. The bell-crank 26 is also provided with a fulcrum pin 28 which joins the bell-crank to an adapter 29 firmly secured to the end of the rod 17. The adapter 29 is preferably in the form of an offset bar to provide an approximately planar upper surface 31 and a similar, planar lower surface 32.

With this arrangement, the manual lever 18 can be moved back and forth to the various notches and through the adapter 29 moves the pivot pin 28 correspondingly so that the pivot pin 28 serves as a fulcrum in any one of several positions. Also, the rod 17 being connected to the lever 18 by a pivot 33 affords a somewhat "floating" mounting. Thus, the bell-crank 26 can operate the control lever 16 in its usual arcuate movement between a rearward position, which is a low speed or high gear ratio position, and a forward position, which is a low gear ratio or high speed position.

The bell-crank 26 adjacent one end, preferably its lower end, is provided with a pivot pin 36 serving as a connector for one end of a tension spring 37, at its other end connected to a bracket 38 stationarily mounted on the power plant 3 so that the spring 37 has a predetermined tension and imposes a predetermined load on the bell-crank 26 tending to rotate the bell-crank in a clockwise direction about the fulcrum 28.

At the other end, the bell-crank 26 is connected by a pivot pin 39 to a clevis 41 at the rearward end of a flexible push-pull cable 42. Conveniently, the cable 42 operates within a sheath 43 also anchored on the power plant by the bracket 38, so that the cable 42 is effective both to pull and to push, if necessary. The sheath 43 is likewise connected to one end of a vacuum apparatus including a vacuum cylinder 46 closed by a rearward head 47 and by a forward head 48, the latter of which has a bracket 49 mounting the apparatus upon the power plant frame.

The vacuum cylinder 46 is at one end connected by a conduit 50 to the intake manifold 8 so that the vacuum or depression in the manifold is made available within a chamber 51 at one end of the cylinder 46. If desired, there can be provided a three-way cock 52 in the conduit 50 subject to control through a rod 53 extending to a manual button 54 convenient to the tractor operator. When the cock 52 is appropriately operated, the vacuum is shut off from the cylinder 46 and atmospheric air is admitted thereto. This is to render the device inoperative upon certain occasions but in normal operation the three-way valve 52 is arranged so that the manifold depression is made available within the vacuum apparatus.

Disposed within the cylinder 46 and reciprocable therein is a composite piston 56 made up of a central rod 57 having an anchor 58 to hold the push-pull cable 42. The piston also includes a rearward head 59 serving as a support for a packing cup 60 held in place by a nut 61. The piston also includes, threadedly mounted on the rod 57, a front head 62 secured in position by a lock nut 63. The front head 62 has an aperture 64 therein affording communication to a chamber 65 between the two piston heads. The rearward head 59 has a multiple opening 66 therein affording communication between the chamber 65 and the volume 68 adjacent the rearward cylinder head 47.

The volume 68 is normally in communication with the atmosphere but not directly. Preferably, a conduit 69 connects through the head 47 to the interior of the ventilated crankcase of the engine 7. A ventilated crankcase is a standard construction and is a portion of the engine having a rather oily atmosphere and subject to atmospheric pressure at all times, or substantially so, being in communication with the atmosphere through a good air filter so that dust is excluded.

Pursuant to the invention, communication through the piston 56 by means of the port 64, the chamber 65 and the multiple port 66 is controlled. To this end, there is mounted in the rearward head 59 an unbalanced poppet valve 71 having a disc 72 adapted to seat on the subjacent portion of the packing 60 to form a tight seat. The valve 71 has a stem 73 guided in a spider within the multiple port 66 and in alignment with a stub shaft 74 projecting coaxially from the forward head 62. The poppet valve 71 is normally urged off of its seat by a calibrated compression coil spring 76 guided by the stub shaft 74. At one end the spring 76 abuts the forward piston head 62 and at its other end presses against a diametrical cotter key 77 piercing the valve stem 73. With this arrangement, the compression coil spring 76 normally urges the poppet valve disc 72 off of its seat, being stopped, usually, by the cotter pin 77 abutting the adjacent rearward head 59 of the piston.

In addition to the foregoing, the mechanism includes an extension rod 78 on the poppet valve disc 72 in axial alignment with the poppet valve stem 73 and of a length to abut the rearward cylinder head 47 when the piston 56 is in its rearmost position. When the extension 78 is in abutment with the head 47, the poppet valve disc 72 is forced against its seat on the packing 60 and closes communication through the piston against the urgency of the compression spring 76.

In the operation of this device, the manual lever 18 is placed in an intermediate notch 23 and is locked therein so that the rod 17 carries the fulcrum 28 at a set and fixed location and the spring 37 holds or puts the parts in the FIGURE 2 locations. The internal combustion engine 7 is then started and operates at a governed idling speed since there is no load on it. During this idling speed, the vacuum within the intake manifold 8 approximates 18 to 20 inches of mercury column; that is, the manifold pressure is far below atmospheric pressure. Under these conditions, i.e., with the engine idling and with the parts located as shown in FIGURE 2, the valve 71 is in closed position and the vacuum exerted within the chamber 51 and within the chamber 65 is sufficient to hold the valve 71 closed and to pull the piston 56 to the left in FIGURE 2 toward the FIGURE 3 position; that is, the difference in pressure between the atmosphere in the volume 68 and the evacuated chambers 51 and 65 results in a leftward force on the valve 71 and on the piston 56.

As the piston 56 moves to the left, the chamber 68 is supplied with additional atmospheric air from the engine crankcase through the conduit 69. The leftward moving piston tensions the push-pull cable 42 and rocks the bell-crank lever 26 counterclockwise about the stationary fulcrum 28, overcoming the spring 37 and rotating the control lever 16 in a clockwise direction and into its forward position approximately as shown in FIGURE 3. The movement is stopped by an abutment 81 on the bell-crank lever which contacts the lower surface 32 of the adapter 29. The vehicle is thus started in high gear and remains in high gear until such time as the engine assumes a substantial load.

When a heavy load is imposed upon the tractor, the engine governor changes the throttle position so that the intake manifold 8 vacuum changes, for example, to approximately 2 inches of mercury column. Vacuum of approximately 2 inches of mercury column is only slightly below atmospheric pressure but is sufficient to hold the piston 56 in its left-hand, FIGURE 3, position so long as the valve 71 is closed. But at this value of vacuum within the chambers 51 and 65; that is, with a pressure only slightly below atmospheric in the chambers 51 and 65 and with atmospheric pressure in the volume 68, only a small leftward force is imposed on the valve 71 so that the force of the calibrated compression spring 76 is sufficient to overcome the small differential air pressure on the unbalanced valve 71. The then superior spring force is effective to open this poppet valve, substantially as shown in FIGURE 3. When this action occurs, atmospheric air from the ventilated crankcase travels through the conduit 69 into the chamber 68 and flows through the opened multiple passage 66 and through the port 64 into the chamber 51 and thence through the conduit 50 into the intake manifold.

The amount of this flow is relatively small so that the engine operation is not unduly disturbed. The effect, however, is approximately to balance the pressure, i.e., to provide atmospheric pressure on the opposite sides of the piston 56. The spring 37, being now unopposed, has sufficient force to rotate the bell-crank lever 26 in a clockwise direction about the fulcrum 28 and not only pulls the piston 56 rearwardly but also rotates the control lever 16 in a counterclockwise direction from its foremost high speed position into its rearmost low speed position. This is substantially as shown in FIGURE 2, with a stop 82 abutting the upper surface 31 of the adapter 29.

The spring 37 is effective to move the piston 56 far enough rearward so that the extension rod 78 comes into contact with the cylinder head 47. The seat is forced up to the valve disc 72 and the spring 76 is re-compressed as the piston achieves its rearmost position. The valve closure precludes any further air flow through the piston.

Subsequently, when the engine load becomes somewhat lighter the manifold vacuum then increases; i.e., the manifold pressure becomes much lower than atmospheric pressure. At all vacuum values above 2 inches of mercury column, that is, when the manifold pressure is much less than atmospheric, the vacuum or difference in pressure between the volume 68 and the chamber 65 produces a leftward force that holds the valve 71 closed.

The vacuum varies with load changes; that is, when the load is light the manifold pressure is far below atmospheric, but when the load is heavy the manifold pressure is only slightly below atmospheric. When the load lightens sufficiently so that the vacuum value rises to a value around 11 inches of mercury column; that is, the pressure is substantially below atmospheric, the vacuum within the chamber 51 is sufficient, the valve 71 still being held closed by vacuum, to move the piston toward the left in the figures. This puts sufficient pull on the cable 42 to overcome the remaining tension in the spring 37 and rock the bell-crank lever 26 in a counterclockwise direction about the fulcrum 28. This bell-crank motion moves the control lever 16 from its low speed position, as shown in FIGURE 2, back to its high speed position, as shown in FIGURE 3. The spring 37 is fully retensioned and the mechanism is placed in condition for a return shift to low speed when the vacuum again approaches a value of approximately 2 inches of mercury column; that is, when the manifold pressure is only slightly below atmospheric due to a heavy engine load.

With this mechanism, as the manifold vacuum varies generally in accordance with engine operation throughout the operating range, the transmission is automatically shifted between high speed and low speed in order to give the optimum gear ratio between the engine and the final drive wheels. The arrangement is such that when the tractor is going downhill, for example, and the manifold vacuum is of the order of, say, 18 to 20 inches of mercury, a pressure far below atmospheric bell-crank lever is held or rotated counterclockwise and holds or moves the control lever into the high speed position to preclude freewheeling. Somewhat similarly, when the power take-off load is substantial and the engine vacuum is comparable to that obtaining when the tractor itself is operating under a heavy load, the manifold vacuum approaches 2 inches of mercury column; i.e., the manifold pressure is only slightly below atmospheric and then permits the spring 37 to shift the transmission into low speed or to hold it there.

In the event the automatic shift feature is not needed or wanted under certain rare conditions of operation, the valve 52 can be appropriately manipulated to destroy the vacuum connection. Also, the mechanism can always be manually shifted by operation of the manual lever 18. When this lever is shifted, for example, between the notches 23 and 24, the fulcrum 28 is correspondingly shifted from a rearmost to a foremost position and since the spring 37 keeps the bell-crank with the stop 82 against the adapter 29, and inasmuch as the pivots 28 and 27 are nearly enough in line with the rod 17, the lever 16 is shifted from its low speed position into its high speed position. In this location of the parts, even if the vacuum valve 52 is not positioned to destroy the vacuum, the movement of the bell-crank lever is insufficient in this forward fulcrum position to move the control lever 16 enough for a shift. The transmission thus stays in high speed position. Similarly, when the manual lever is moved to the notch behind the notch 23, the lever 16 is shifted into its low speed position and in this rearward fulcrum position any movement of the bell-crank lever is insufficient to move the lever 16 out of low speed position. The lever 18 in its forward position makes the high speed ratio mandatory, in its rearward position makes the low speed ratio mandatory and its middle position permits automatic shifting between high and low speed ratios.

What is claimed is:

1. A transmission control for use with a power plant including an internal combustion engine having an intake manifold and connected to a transmission having a control lever; comprising means on said power plant providing a fulcrum, a bell-crank pivoted on said fulcrum, means for pivoting said bell-crank on said control lever, a first spring connected to said power plant and to said bell-crank, a piston connected to said bell-crank, a vacuum cylinder cooperating with said piston, means connecting said vacuum cylinder to said intake manifold, means defining a flow passage through said piston, a valve controlling flow through said flow passage, a second spring for urging said valve toward open position, and means effective at one position of said piston in said cylinder for moving said valve into closed position.

2. A transmission control for use with a power plant including an internal combustion engine having an intake manifold and connected to a transmission having a control lever; comprising means on said power plant providing a fulcrum, a bell-crank adjacent the center thereof pivoted on said fulcrum, means for pivoting said bell-crank on said control lever, a first spring connected to said power plant and to said bell-crank adjacent one end thereof, a piston connected to said bell-crank adjacent the other end thereof, a vacuum cylinder on said power plant cooperating with said piston, means connecting said vacuum cylinder to said intake manifold, means defining a flow passage through said piston, a valve in said piston controlling flow through said flow passage, a second spring for urging said valve toward open position, and means effective at one position of said piston in said cylinder for moving said valve into closed position.

3. A transmission control for use with a power plant including an internal combustion engine having an intake manifold and connected to a transmission having a control lever; comprising means on said power plant providing a movable fulcrum, a bell-crank pivoted adjacent the center thereof on said fulcrum, means for pivoting said bell-crank on said control lever, a first spring for urging said bell-crank to rotate in one direction about said fulcrum and so urge said control lever toward one position, a piston for urging said bell-crank to rotate in the opposite direction about said fulcrum and so to urge said control lever away from said one position, a vacuum cylinder cooperating with said piston, means connecting said vacuum cylinder to said intake manifold, means defining a flow passage through said piston, a poppet valve controlling flow through said flow passage, a second spring for urging said poppet valve toward open position, and means effective in one position of said piston in said cylinder for closing said poppet valve.

4. A transmission control for use with a power plant including an internal combustion engine having an intake manifold and connected to a transmission having a control lever; comprising means for urging said control lever in one direction with a predetermined force, means including a vacuum cylinder and piston mechanism for urging said control lever in the opposite direction, means for connecting said vacuum cylinder to said intake manifold, means forming a flow passage from one side of said piston to the other side thereof, a valve for controlling flow through said passage, means for urging said valve open with a predetermined force, and means effective in one position of said piston in said cylinder for closing said valve.

5. A transmission control for use with a power plant including an internal combustion engine having an intake manifold and connected to a trasmission having a control lever; comprising an operating lever, means forming a fulcrum for said operating lever, means connecting said operating lever to said control lever, means effective adjacent one end of said operating lever for urging said control lever in one direction with a predetermined force, means including a vacuum cylinder and piston mechanism effective adjacent the other end of said operating lever for urging said control lever in the opposite direction, means forming an atmospheric connection to said vacuum cylinder on one side of said piston, means forming a connection betwen said intake manifold and said vacuum cylinder on the other side of said piston, means forming a flow passage from one side of said piston to the other side thereof, an unbalanced valve controlling flow through said passage, means for urging said unbalanced valve open with a predetermined force, and means dependent upon the position of said piston in said cylinder for closing said valve.

References Cited in the file of this patent

UNITED STATES PATENTS

| | | |
|---|---|---|
| 1,296,735 | Arbuckle | Mar. 11, 1919 |
| 1,629,804 | Melcher | May 24, 1927 |
| 2,631,701 | Ainsworth et al. | Mar. 17, 1953 |